(12) United States Patent
Bitran et al.

(10) Patent No.: US 7,904,112 B2
(45) Date of Patent: *Mar. 8, 2011

(54) SIMULTANEOUS OPERATION OF WIRELESS LAN AND LONG-RANGE WIRELESS CONNECTIONS

(75) Inventors: Yigal Bitran, Ramat Hasharon (IL); Eitan Solomon, Rishon Le-Zion (IL)

(73) Assignee: Altair Semiconductor Ltd., Hod-Hasharon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/702,332

(22) Filed: Feb. 9, 2010

(65) Prior Publication Data
US 2010/0142504 A1 Jun. 10, 2010

Related U.S. Application Data

(63) Continuation of application No. 12/426,252, filed on Apr. 19, 2009, now Pat. No. 7,688,784, which is a continuation of application No. 11/638,267, filed on Dec. 12, 2006, now Pat. No. 7,545,787.

(51) Int. Cl.
*H04M 1/00* (2006.01)
(52) U.S. Cl. ............... 455/552.1; 455/78; 455/550.1; 455/41.2
(58) Field of Classification Search .......... 370/310, 370/328, 331–349, 318, 449; 455/432.1–442, 455/458, 41.2, 550.1, 553.1, 456.1–456.2, 127.1, 127.4–127.5, 78, 84
See application file for complete search history.

(56) References Cited

U.S. PATENT DOCUMENTS

| | | | |
|---|---|---|---|
| 7,289,804 B2* | 10/2007 | Kim | 455/432.1 |
| 7,430,421 B2* | 9/2008 | Park | 455/456.1 |
| 7,542,728 B2* | 6/2009 | Bitran et al. | 455/73 |
| 7,545,787 B2* | 6/2009 | Bitran et al. | 370/338 |
| 7,567,820 B2* | 7/2009 | Bitran et al. | 455/552.1 |
| 7,688,784 B2* | 3/2010 | Bitran et al. | 370/329 |
| 2005/0128990 A1* | 6/2005 | Eom et al. | 370/338 |
| 2005/0195786 A1* | 9/2005 | Shpak | 370/338 |
| 2007/0124478 A1* | 5/2007 | Abdelhamid et al. | 709/227 |
| 2007/0275746 A1* | 11/2007 | Bitran | 455/509 |

* cited by examiner

*Primary Examiner* — Kamran Afshar
(74) *Attorney, Agent, or Firm* — D. Kligler I.P. Services Ltd.

(57) ABSTRACT

A method for communication includes establishing a first connection between a wireless terminal and a base station of a long-range wireless data network, which operates in accordance with a first protocol that defines a sequence of time frames for transmission of data between the wireless terminal and the base station. A signal is sent from the wireless terminal to the base station identifying an interval including one or more of the time frames during which the wireless terminal will not receive data from the base station. During the interval, a second connection is established between the wireless terminal and an access point of a wireless local area network (WLAN) in accordance with a second protocol, different from the first protocol.

18 Claims, 7 Drawing Sheets

SIMULTANEOUS OPERATION OF WIRELESS LAN AND LONG-RANGE WIRELESS CONNECTIONS

CROSS-REFERENCE TO RELATED APPLICATION

This application is a continuation of U.S. patent application Ser. No. 12/426,252, filed Apr. 19, 2009 now U.S. Pat. No. 7,688,784, which is a continuation of U.S. patent application Ser No. 11/638,267, filed Dec. 12, 2006 (now U.S. Pat. No. 7,545,787), which claims the benefit of U.S. Provisional Patent Application 60/772,167, filed Feb. 9, 2006, which is incorporated herein by reference. This application is related to two other U.S. Patent Applications, filed Dec. 12, 2006: U.S. patent application Ser. No. 11/638,629 (now U.S. Pat. No. 7,542,728), entitled, "Dual-Function Wireless Data Terminal," and U.S. patent application Ser. No. 11/638,265 (now U.S. Pat. No. 7,567,820), entitled, "Scanning for Network Connections with Variable Scan Rate," both of which are incorporated herein by reference.

FIELD OF THE INVENTION

The present invention relates generally to wireless communications, and specifically to wireless terminals capable of operating in multiple different data networks.

BACKGROUND OF THE INVENTION

Wireless local area networks (WLANs) have gained broad popularity. The original IEEE 802.11 WLAN standard was designed to enable communications at 1-2 Mbps in a band around 2.4 GHz. More recently, IEEE working groups have defined the 802.11a, 802.11b, 802.11e, 802.11g, 802.11n and other extensions to the original standard, in order to enable higher data rates. In the context of the present patent application and in the claims, the term "802.11" is used to refer collectively to the original IEEE 802.11 standard and all its variants and extensions, unless specifically noted otherwise.

WiMAX (Worldwide Interoperability for Microwave Access) is a new technology for wireless packet data communications, which is similar in concept to IEEE 802.11, but has a number of enhancements designed to improve performance and range. The original WiMAX standard, IEEE 802.16, specified WiMAX in the 10-66 GHz range. More recently, IEEE 802.16a added support for the 2-11 GHz range, and IEEE 802.16e (approved as IEEE 802.16-2005) extended WiMAX to mobile applications, using an enhanced orthogonal frequency division multiple access (OFDMA) modulation scheme. In the context of the present patent application and in the claims, the term "802.16" is used to refer collectively to the original IEEE 802.16 standard and all its variants and extensions, unless specifically noted otherwise.

Although there are some similarities in the physical layer interfaces (PHY) of WLAN and WiMAX systems, the medium access control (MAC) layers specified by the respective standards differ significantly. In an 802.11 WLAN, the MAC layer typically uses contention, as in Ethernet networks: Mobile stations compete for the resources of access points on a random basis. By contrast, the 802.16 MAC typically uses scheduling, in which the mobile station is allocated a time slot by the base station. The time slot can enlarge and constrict, but it remains assigned to the subscriber station, meaning that other subscribers are not supposed to use it and must take their turn.

Other broadband wireless standards are also in development. Examples include the Third Generation Partnership Project (3GPP) Long Term Evolution (LTE), 3GPP2 Evolution-Data Optimized (EVDO) Rev C and the IEEE 802.20 High Speed Mobile Broadband Wireless Access (MBWA) specifications.

SUMMARY OF THE INVENTION

WLAN and WiMAX are complementary technologies: While WiMAX provides broad, long-range coverage with moderate bandwidth over wide areas, WLAN provides local coverage at low cost and very high bandwidth. Embodiments of the present invention that are described hereinbelow provide wireless terminals that can communicate with both WLAN access points and WiMAX base stations. Although these embodiments relate specifically to certain features of the 802.11 and 802.16 families of standards, the principles of the present invention may be extended, mutatis mutandis, to integration of short- and long-range wireless data networks of other types, such as short-range Bluetooth networks and long-range cellular data networks, such as 3GPP LTE.

There is therefore provided, in accordance with an embodiment of the present invention, a method for communication, including:

establishing a first connection between a wireless terminal and a base station of a long-range wireless data network, which operates in accordance with a first protocol that defines a sequence of time frames for transmission of data between the wireless terminal and the base station;

sending a signal from the wireless terminal to the base station identifying an interval including one or more of the time frames during which the wireless terminal will not receive data from the base station; and during the interval, establishing a second connection between the wireless terminal and an access point of a wireless local area network (WLAN) in accordance with a second protocol, different from the first protocol.

In disclosed embodiments, the long-range wireless data network is a WiMAX network, wherein the WLAN operates in accordance with an IEEE 802.11 standard, and the WiMAX network operates in accordance with an IEEE 802.16 standard. In one embodiment, sending the signal includes sending a reduced availability message indicating a starting time and a duration of the interval during which the second connection is to be established. Additionally or alternatively, sending the signal includes using a reservation message in order to reserve first time frames for the transmission of the data between the wireless terminal and the base station and second time frames for inclusion in the interval during which the second connection is to be established.

In some embodiments, establishing the first connection includes transmitting first data between the wireless terminal and the base station during the time frames outside the interval, and establishing the second connection includes transmitting second data between the wireless terminal and the access point during the interval. Typically, sending the signal includes identifying a sequence of intervals, such that the second data are transmitted between the wireless terminal and the access point during the intervals, and the first data are transmitted between the wireless terminal and the base station during the time frames outside the intervals. Establishing the second connection may include suspending transmission of the first data over the first connection upon establishing the second connection, and resuming the transmission of the first data over the first connection when the second connection is lost. Additionally or alternatively, the terminal includes a memory for holding both the first and the second data simultaneously.

In some embodiments, sending the signal includes sensing periodic beacons transmitted by the access point, and adjusting the interval responsively to a transmission period of the beacons. Typically, adjusting the interval includes selecting a start time of the interval so that one of the beacons occurs during an initial portion of the interval. Alternatively or additionally, establishing the second connection includes transmitting a polling signal from the wireless terminal to the access point in response to one of the beacons during the interval.

In one embodiment, the methods includes transmitting a bandwidth request from the wireless terminal to the base station in order to resume the transmission of the data between the wireless terminal and the base station over the first connection after conclusion of the sleep interval.

In another embodiment, establishing the second connection includes transmitting an uplink message from the wireless terminal to the access point during the interval using a terminal-initiated transmission mechanism.

In a further embodiment, establishing the first connection includes assigning time slots within the time frames for communication between the base station and the wireless terminal, and the method includes identifying periods within the time frames outside the interval that are not included in the assigned time slots, and transmitting the data over the second connection during the periods.

Additionally or alternatively, establishing the second connection includes scanning periodically for available access points, wherein a rate of the scanning is determined by a measure of mobility of the wireless terminal.

In one embodiment, establishing the second connection includes transmitting a radio frequency (RF) probe signal from the wireless terminal requesting a response from the access point, and during a predetermined time period following the probe signal, intermittently switching a RF receiver of the wireless terminal on and off, and sampling radio signals received while the RF receiver is on so as to determine a probability that the radio signals include a response to the probe signal transmitted by the access point.

There is also provided, in accordance with an embodiment of the present invention, a wireless communication terminal, including:

a radio frequency (RF) transceiver; and a baseband processing circuit, which is coupled to cause the RF transceiver to transmit and receive signals over the air so as to establish a first connection between the terminal and a base station of a long-range wireless data network, which operates in accordance with a first protocol that defines a sequence of time frames for transmission of data between the terminal and the base station, and to send a signal to the base station identifying an interval including one or more of the time frames during which the terminal will not receive data from the base station, and to establish, during the interval, a second connection between the terminal and an access point of a wireless local area network (WLAN) in accordance with a second protocol, different from the first protocol.

There is additionally provided, in accordance with an embodiment of the present invention, apparatus for communication, including:

first and second antennas, for receiving respective first and second radio frequency (RF) signals carrying data;

first and second RF receiver circuits, which are respectively coupled to receive the first and second RF signals from the first and second antennas and to downconvert the first and second RF signals so as to output first and second downconverted signals; and a baseband processing circuit, which is coupled to receive and process the first and second downconverted signals so as to extract the data from the signals, the baseband processing circuit having a first configuration for processing the first and second downconverted signals together so as to extract a single stream of the data carried by both of the first and second RF signals, and a second configuration for processing the first and second down-converted signals separately, so as to extract different, first and second streams of the data carried respectively by the first and second RF signals.

In some embodiments, the apparatus includes first and second frequency synthesizers, coupled to provide respective first and second frequency inputs to the first and second RF receiver circuits, wherein in the second configuration, the first and second frequency inputs are tuned to different frequencies so as to permit the first and second RF receiver circuits to receive the first and second RF signals on different, first and second channels. Typically, the first and second channels belong respectively to different, first and second wireless networks.

Typically, in the second configuration, the baseband processing circuit is arranged to scan the second channel so as to establish a connection with the second wireless network while communicating with the first wireless network on the first channel. Additionally or alternatively, in the first configuration, the baseband processing circuit applies multiple-input multiple-output (MIMO) processing to the first and second downconverted signals.

There is also provided, in accordance with an embodiment of the present invention, a method for communication, including:

receiving, via first and second antennas, respective first and second radio frequency (RF) signals carrying data;

downconverting the first and second RF signals using first and second RF receiver circuits, which are respectively coupled to the first and second antennas, so as to output first and second downconverted signals;

processing the first and second downconverted signals together in a first configuration of a baseband processing circuit so as to extract the data from the signals so as to extract a single stream of the data carried by both of the first and second RF signals; and processing the first and second downcoverted signals separately in a second configuration of the baseband processing circuit so as to extract different, first and second streams of the data carried respectively by the first and second RF signals.

The present invention will be more fully understood from the following detailed description of the embodiments thereof, taken together with the drawings in which:

DETAILED DESCRIPTION OF EMBODIMENTS

Overview

Figure 1:
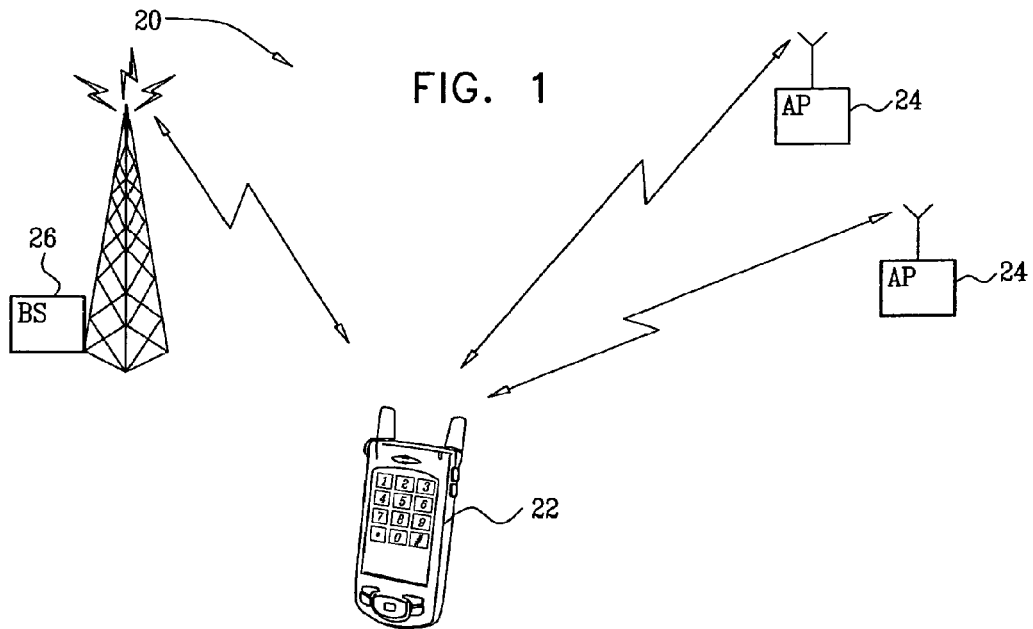
FIG. 1 is a schematic, pictorial illustration showing a multi-network system for wireless data communications, in accordance with an embodiment of the present invention.

FIG. 1 is a schematic, pictorial illustration of a multi-network wireless communication system 20, in accordance with an embodiment of the present invention. In this system, a wireless terminal 22 communicates with both WLAN access points 24 and WiMAX base stations 26. Depending on the location and operating parameters of terminal 22, the terminal may access the Internet and various network services over either a WLAN or a WiMAX link, and may in some cases be handed over from WLAN to WiMAX, and vice versa. Although FIG. 1 shows a certain type of wireless terminal by way of illustration, the embodiments described hereinbelow are applicable to substantially any sort of mobile computing and communication device that has the appropriate multi-network communication capabilities. The term "wireless terminal" as used in the present patent application and in the claims should therefore be understood broadly to refer to any and all suitable sorts of consumer electronics, computing and communication devices in which the principles of the present invention may be implemented.

In some embodiments of the present invention, terminal 22 communicates over both WLAN and WiMAX networks using the same antenna, radio frequency (RF) transceiver, and baseband processing circuits. Integrating WLAN and WiMAX functionality in this manner is possible and desirable because both networks use OFDM technology over similar radio frequencies and bandwidths. Sharing the circuit components in this manner can reduce the cost and size of the terminal.

Sharing resources in a single terminal between WLAN and WiMAX functionalities can lead to resource conflicts, however, particularly in view of the differences between the MAC protocols mandated by the WLAN and WiMAX networks. Each protocol was designed with the assumption of full availability of the antenna, RF transceiver and baseband functionality. Therefore, some embodiments of the present invention provide methods for controlling the timing of transmission and reception by terminal 22 so as to avoid conflict between WLAN and WiMAX communications. Such methods are particularly useful in managing the use of shared circuit components, but they can be advantageous, as well, even in dual-function terminals having separate WLAN and WiMAX circuits that may be active simultaneously.

In some embodiments of the present invention, terminal 22 is capable of roaming between WLAN and WiMAX networks without interrupting application-level functions. For example, the terminal may be handed over from a WLAN access point to a WiMAX base station, or vice versa, in the middle of a communication session (such as a VoIP telephone call). To facilitate this sort of handover, the terminal scans for one network while it is connected to and communicating over the other. The scanning is coordinated in order to avoid comprising quality of service (QoS) requirements of real-time applications (such as VoIP) and to minimize power consumption.

Although the embodiments described hereinbelow relate specifically to coexistence between WiMAX and WLAN functionalities within the same mobile terminal, the principles of the present invention may similarly be applied in multi-function terminals that support other broadband wireless technologies, such as Bluetooth and technologies mandated by the IEEE 802.20, 3GPP LTE or 3GPP2 EVDO Rev C specification. These other technologies may be supported in addition to or instead of the IEEE 802.11 and IEEE 802.16 support functions that are described hereinbelow. A mobile terminal supporting Bluetooth functions, in addition to IEEE 802.11 and IEEE 802.16 functions, is described, for example, in U.S. Provisional Patent Application 60/803,192, filed May 25, 2006, which is assigned to the assignee of the present patent application, and whose disclosure is incorporated herein by reference.

Figure 2:
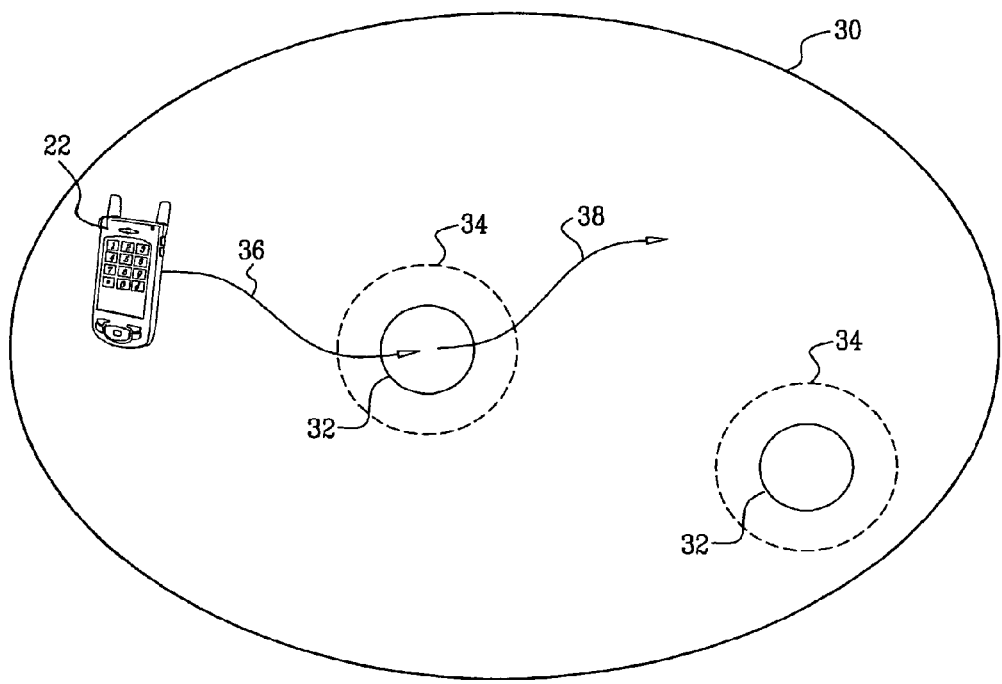
FIG. 2 is a diagram that schematically illustrates movement of a mobile terminal through coverage areas of WiMAX and WLAN networks, in accordance with an embodiment of the present invention.

FIG. 2 is a diagram that schematically illustrates movement of terminal 22 through coverage areas 30 and 32 of WiMAX and WLAN networks, respectively, in accordance with an embodiment of the present invention. The WiMAX network typically covers a large area 30, in which WLAN coverage areas 32, commonly referred to as "hotspots," are distributed. Within WLAN coverage areas 32, it is generally desirable that terminal 22 communicate with a WLAN access point, for reasons of enhanced bandwidth and reduced cost and power consumption.

WLAN coverage areas 32 are typically surrounded by a transition region 34 that is characterized by lower-quality WLAN coverage. As terminal 22 moves along a "roam-in" path 36 from WiMAX coverage area 30 into one of WLAN coverage areas 32, terminal 22 automatically senses that it has entered the WLAN coverage area and connects to the WLAN. The timing of the handover is usually not critical, since WiMAX coverage is generally maintained within the WLAN coverage areas. (Exceptions may occur inside certain buildings.)

On the other hand, as terminal 22 moves along a roam-out path 38, exiting from WLAN coverage area 32, it is desirable that terminal 22 sense immediately that it has passed into transition region 34 and switch over to WiMAX communication before it has lost its connection with the WLAN access point. For this purpose, terminal 22 may re-establish its connection with the WiMAX base station as soon as it enters region 34, or it may even maintain a connection with the WiMAX base station while it is in region 32. The WiMAX communication under these circumstances is coordinated so as to minimize the additional power consumption and avoid interference with WLAN data communication. Methods and device architectures that can be used to facilitate these sorts of interleaved communication models and inter-network handovers are described further hereinbelow.

Hardware Architecture

Figure 3:
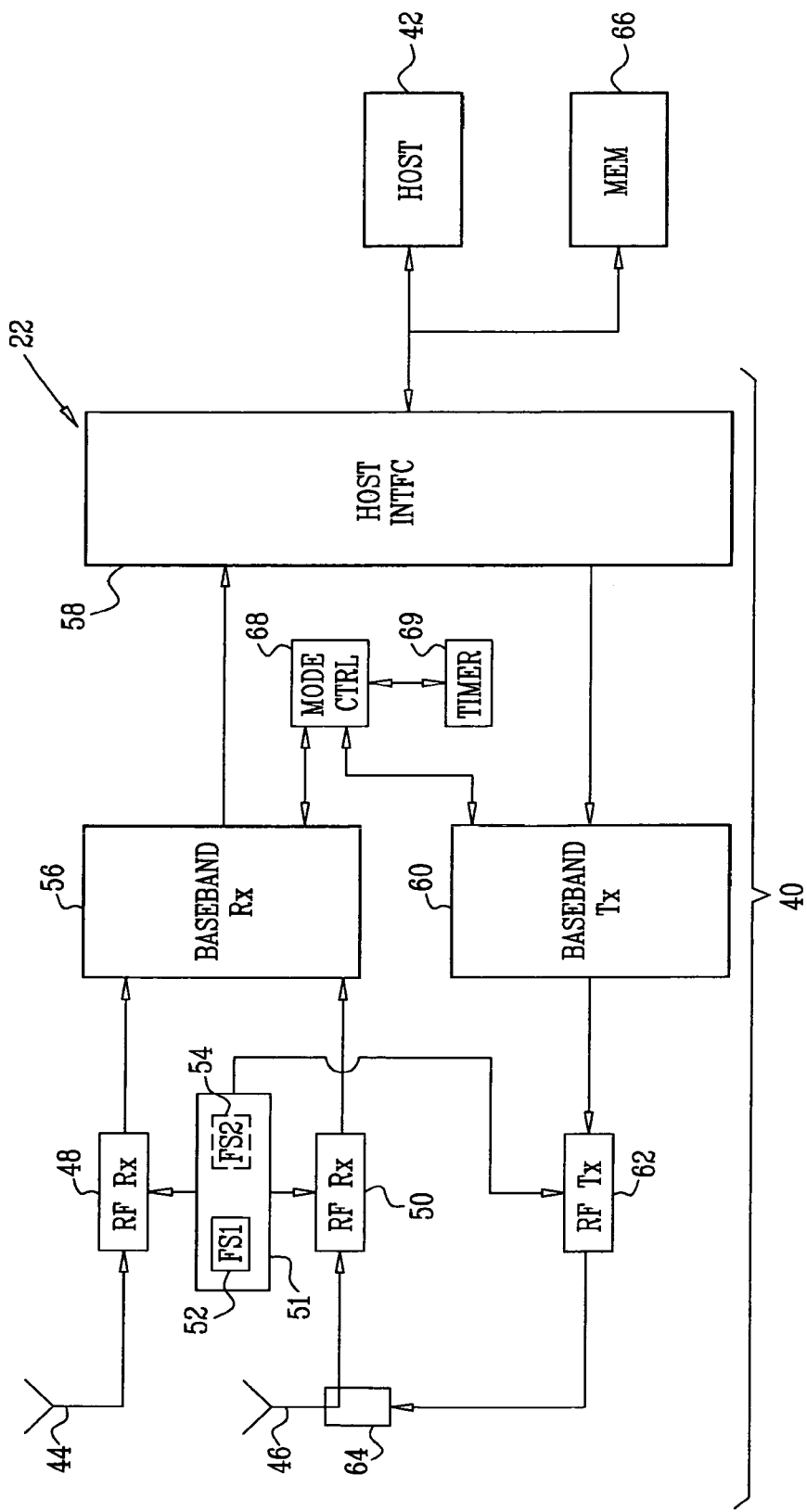
FIG. 3 is a block diagram that schematically shows elements of a dual-function mobile terminal, in accordance with an embodiment of the present invention.

FIG. 3 is a block diagram that schematically shows elements of terminal 22, in accordance with an embodiment of the present invention. The terminal comprises a dual-function wireless modem 40, which serves a host processor 42. The modem comprises dual antennas 44 and 46, which are connected to dual RF receivers 48 and 50 in a multiple-input multiple-output (MIMO) configuration, as is mandated by the WiMAX Forum. Each RF receiver downconverts the received signals using a frequency input provided by a frequency synthesis circuit 51. This circuit may comprise a single frequency synthesizer or, optionally, dual synthesizers 52 and 54, for reasons explained hereinbelow. The outputs of RF receivers 48 and 50 (which may be either at intermediate frequency (IF) or I/Q baseband signals) are processed by a baseband receiver circuit 56, which outputs a decoded stream of digital data via a host interface 58 to host 42. Host data, as well as program code, are stored in a host memory 66.

For uplink transmission, host 42 passes data and instructions via host interface 58 to a baseband transmitter circuit 60. This circuit outputs IF or I/Q baseband signals to a RF transmitter 62, which is coupled via a switch 64 to at least one of antennas 46. Frequency synthesis circuit 51 provides a frequency input for use by transmitter 62 in upconversion.

Figure 4:
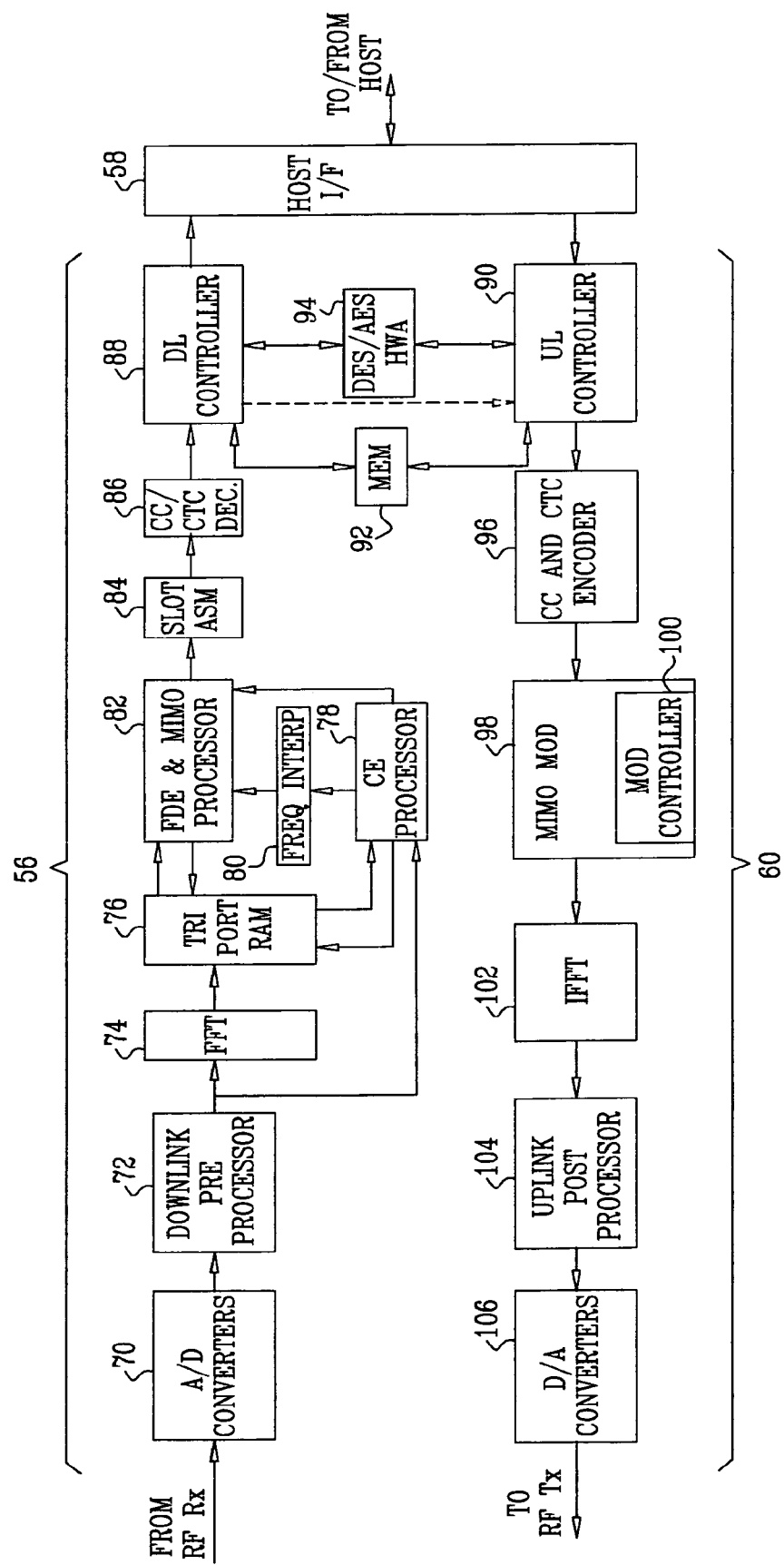
FIG. 4 is a block diagram that schematically shows details of baseband processing components in a dual-function mobile terminal, in accordance with an embodiment of the present invention.

Since both IEEE 802.11 and IEEE 802.16e use OFDM schemes in the same frequency range, RF receivers 48, 50 and transmitter 62, as well as baseband circuits 56 and 60, may be used for processing both WLAN and WiMAX transmissions. In one embodiment, a mode controller 68 switches the RF and baseband circuits between WLAN and WiMAX operation on a schedule determined by a timer 69. (Although the mode controller and timer are separated from baseband circuits 56 and 60 in FIG. 3 for the sake of clarity, these elements are actually a part of the baseband circuitry of terminal 22 and may be implemented, for example, as part of the MAC control circuits described below. Details of the baseband circuitry are shown in FIG. 4.) In other words, mode controller 68 switches the RF and baseband circuits back and forth between WiMAX and WLAN operation for short periods so as to establish and maintain contact with both networks, as described further hereinbelow. A single frequency synthesizer 52 is sufficient for this embodiment.

In an alternative embodiment, dual synthesizers 52 and 54 may be used to enable two basic modes of operation:

For normal WiMAX operation in MIMO configuration, the RF receivers are both used to receive and process WiMAX signals at the same frequency.

On the other hand, when terminal 22 is receiving and processing WLAN signals, one of the RF receivers may be used as a WLAN receiver, while the other RF receiver is used to receive WiMAX signals. In this mode, synthesizers 52 and 54 provide the respective RF receivers with different frequency inputs, one tuned to the WiMAX base station frequency and the other to the WLAN access point frequency.

This latter, "hybrid" mode of operation enables terminal 22 to remain in contact with the WiMAX base station during WLAN operation in areas 32 (FIG. 2), so as to ensure smooth handover to WiMAX operation in transition region 34. This mode may also be used intermittently during WiMAX operation in order to detect WLAN transmissions. Baseband receiver circuit 56 is likewise flexibly configurable to support either MIMO WiMAX operation or hybrid WLAN/WiMAX operation.

FIG. 4 is a block diagram that schematically shows details of baseband circuits 56 and 60, in accordance with an embodiment of the present invention. This diagram illustrates how other elements (in addition to the RF receivers) may be shared by IEEE 802.11 and IEEE 802.16 functions of terminal 22. Specifically, the functional blocks shown in the figure meet the requirements of both IEEE 802.11 OFDM and IEEE 802.16 OFDMA operation, as defined in the applicable standards. Although these blocks are separated in the figure for conceptual clarity, in practice they may typically be integrated together on a single integrated circuit chip or chip set. Alternatively or additionally, certain of these functions may be performed in software on a suitable programmable processor.

The description of FIG. 4 that follows will focus on how elements of circuits 56 and 60 may be configured to process both IEEE 802.11 and IEEE 802.16 signals. Implementation of the other elements and features of these circuits will be apparent to those skilled in the WLAN and WiMAX art and is beyond the scope of the present invention. For compatibility with legacy single-carrier WLAN access points, which may operate in IEEE 802.11b or mixed-mode IEEE 802.11g networks, terminal 22 may comprise an additional 802.11b-compatible module (not shown). Alternatively or additionally, some of the elements of the circuits shown in FIG. 4 may also be adapted for single-carrier operation.

Incoming signals from RF receivers 48 and 50 (IF or baseband I/Q) are digitized by dual-channel analog/digital (A/D) converters 70 (one channel per antenna), which typically operate at 10-bit resolution, each processing 40 MSPS. A dual-channel downlink preprocessor 72, typically processing 10 MHz signal bandwidth per channel (or 20 MHz for single-channel), down-converts IF samples to baseband, if necessary, and performs preliminary filtering and resampling functions. A dual-channel, 1024-bin Fast Fourier Transform (FFT) processor 74 (2048 bins single-channel) transforms the time-domain samples in each channel to the frequency domain. The frequency-domain samples are stored in a tri-port random access memory (RAM) 76 for further processing.

A programmable channel estimation (CE) processor 78 reads and processes the time-domain samples from preprocessor 72, as well as the frequency-domain samples in RAM 76, in order to determine channel coefficients for equalization and MIMO processing. The CE processor is provided with two sets of firmware—one for WiMAX signals and the other for WLAN—which are loaded into the program memory of the processor according to the type of signals to be processed. For WLAN signals, the CE processor typically uses preamble-based acquisition and pilot-based signal tracking.

A frequency interpolator 80 processes the channel coefficients that are output by CE processor 78, and inputs the coefficients to a frequency-domain equalization (FDE) and MIMO processor 82. This processor, like the CE processor, is programmable, with different firmware for WiMAX and WLAN processing. For WiMAX, MIMO processing may be used for enhanced interference cancellation. For WLAN operation, MIMO or SIMO (single-input multiple-output) processing may be used for 802.11n reception and for improving 802.11g performance, respectively. In either case, for each received symbol, processor 82 outputs an array of digital values, corresponding to the bits encoded on each sub-carrier.

For WiMAX OFDMA signals, a slot assembler 84 extracts the digital values belonging to the time/frequency slot that is assigned to terminal 22. A decoder 86 performs convolutional code (CC) or convolutional turbo code (CTC) decoding of the data values, as mandated by the IEEE 802.16e standard. Typically, decoder 86 applies hybrid automatic repeat request (HARQ) error control with incremental redundancy (IR) and Chase combining, as are known in the art. The functions of the slot assembler and HARQ combiner are not required for WLAN operation, and these blocks are therefore inactive in processing of WLAN data.

A programmable downlink (DL) controller 88 performs MAC functions according to the applicable IEEE 802.11 or IEEE 802.16 protocol, as appropriate. Controller 88 then passes the data payloads of the frames that is receives to host 42 via host interface 58. Similarly, a programmable uplink (UL) controller 90 performs MAC functions on uplink data that are generated for transmission by host 42. Although controllers 88 and 90 are shown, for the sake of clarity, as separate unit, in practice a single MAC control circuit may be used for both DL and UL functions. Like processors 78 and 82, controllers 88 and 90 are driven by firmware, which is chosen and loaded according to the type of signals that terminal 22 is receiving. Depending on the mode of operation (WLAN or WiMAX) downlink controller 88 passes appropriate synchronization and control signals to uplink controller 90, such as uplink map (UL-MAP) signals identifying slot assignments in WiMAX and channel feedback instructions. Controllers 88 and 90 typically use at least one on-chip memory 92 for storing data (frame buffer) and program code. Techniques that enable efficient sharing of this memory between WLAN and WiMAX functions are described hereinbelow. The downlink and uplink controllers may also share a hardware accelerator (HWA) 94 for encryption and decryption according to the applicable Data Encryption Standard (DES) or Advanced Encryption Standard (AES).

Uplink WiMAX data frames generated by UL controller 90 are encoded by a CC/CTC encoder 96, and are then input to a MIMO modulator 98. A modulation controller 100 determines the modulation scheme and bit allocation that are to be used. Modulator 98 is programmable in firmware for either WiMAX or WLAN transmission. In the latter case, modulator 98 allocates the data bits to sub-carriers, using forward error correction (FEC), as mandated by the IEEE 802.11g standard. An inverse FFT (IFFT) processor 102 converts the multi-bin frequency-domain samples that are output by modulator 98 to the time domain. An uplink post-processor 104 performs digital filtering and, if necessary, up-converts the samples to IF, following which digital/analog (D/A) converters generate analog IF or baseband I/Q signals for output to RF transmitter 62.

Sharing MAC Memories

As noted above, uplink and downlink MAC controllers 88 and 90 use memory 92 to hold their operating programs and data. For rapid memory access, it is advantageous that the memory be located on the same chip as the MAC controllers. To minimize chip size, the memory footprint should be as small as possible. To achieve this objective, it is desirable that the same memory be used for both WLAN and WiMAX functions, without unduly increasing memory size over what would be required for either WLAN or WiMAX operation alone.

A major part of the data memory used by controllers 88 and 90 is the frame buffer. To permit this memory to be shared, each frame in the buffer may be marked with a tag (one bit) that indicates whether the frame belongs to the WLAN or WiMAX frame sequence. When a frame is written to the buffer, a buffer manager (which may be functionally integrated into one or more of the components accessing memory 92) tags the frame appropriately. Based on this tag, the buffer manager is able to output the appropriate frames to host interface 58 or uplink controller 90 depending on whether WLAN or WiMAX processing is called for.

Figure 5:
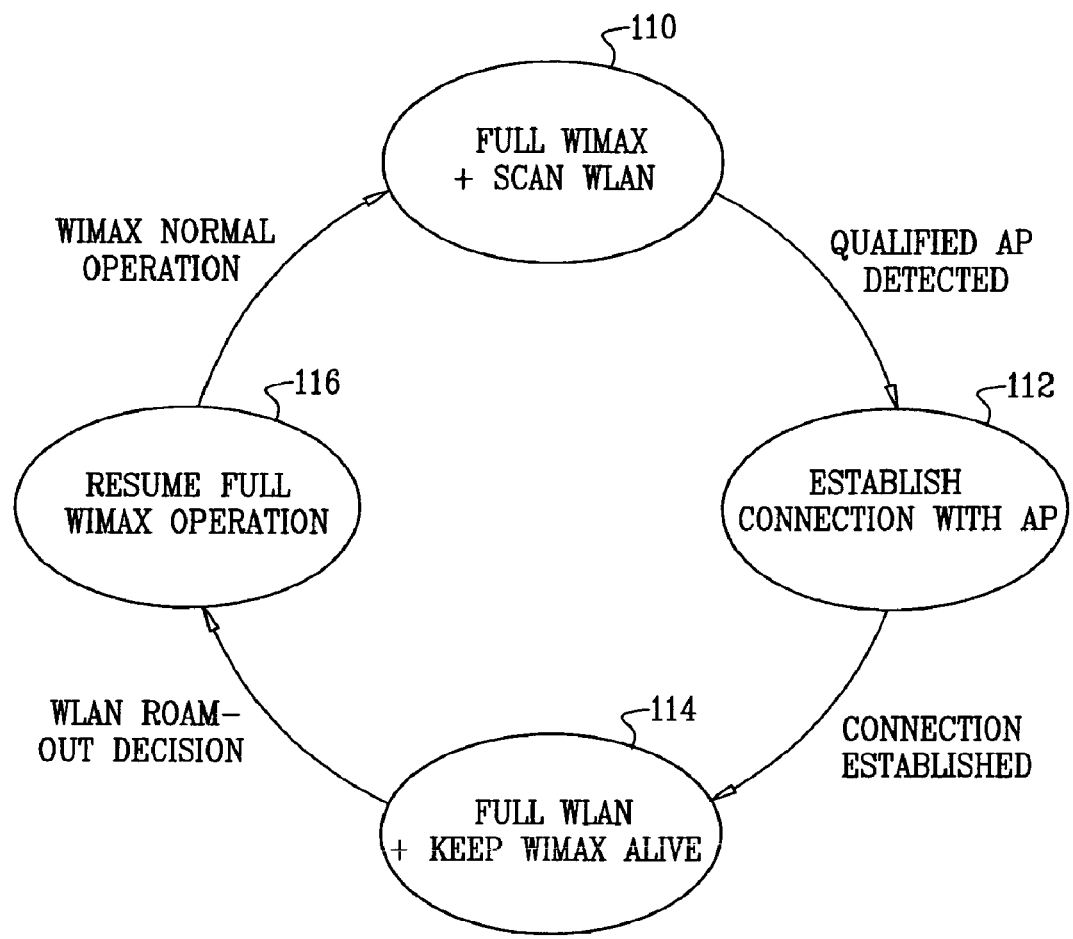
FIG. 5 is a state diagram that schematically illustrates a method for dual-function operation of a mobile terminal, in accordance with an embodiment of the present invention.

FIG. 5 is a state diagram that schematically illustrates a method for sharing program memory between WLAN and WiMAX operating modes, in accordance with an embodiment of the present invention. This method is built on the ability of terminal 22 to manage its WLAN and WiMAX functionalities at different levels. Typically, the levels may depend on whether the terminal is being served by WLAN access point 24 or WiMAX base station 26, or is in transition from one type of service to the other, as explained hereinabove with reference to FIG. 2. For example, the functionalities may be partitioned as follows:

TABLE I

FUNCTIONALITY LEVELS

| Level | Function | WLAN | WiMAX |
| --- | --- | --- | --- |
| 1 | Scanning* | Scan frequencies, handle probe request-response and parse access point capabilities | Functionality to keep the link alive (periodic ranging, sleep control, etc.) |
| 2 | Connection | Establish connection with access point | Reduced WiMAX functionality |
| 3 | Normal operation | Full functionality | Full functionality |

(*Some of these scanning functions are described in greater detail hereinbelow.)

At full functionality (Level 3) processors 88 and 90 require that the complete package of MAC software code be loaded into memory 92. As the functionality level decreases, however, parts of the software may be removed from memory 92 and held off-chip, in host memory 66, for example. Since processors 88 and 90 may operate at Level 3 for either WLAN or WiMAX communication, but not necessarily both simultaneously, the amount of on-chip program memory that is required to support dual-function WLAN/WiMAX operation can be substantially less than twice the amount of program memory that would be required in a single-mode terminal.

Referring now to the details of FIG. 5, in a normal WiMAX operation state 110, terminal carries out normal data communications with base station 26, while scanning for possible connections to WLAN access points. Typically, while in state 110, terminal 22 scans for access points using the probe request/probe response protocol provided by the IEEE 802.11 standard. In this state, terminal 22 operates at WiMAX Level 3 and WLAN Level 1. Therefore, only a part of the complete WLAN software is loaded into memory 92.

Upon receiving a WLAN probe response, terminal 22 checks the access point capabilities in order to determine its suitability for a connection. Once the terminal determines that the WLAN access point is qualified, it moves to a WLAN connection establishment state 112. For the purposes of establishing the connection, the terminal loads additional WLAN software into memory 92, while unloading some of the WiMAX software to make room. As a result, both WiMAX and WLAN functionalities now operate at Level 2. State 112 is short-lived, in order to avoid interrupting application-level communications by the terminal.

Once the connection with the WLAN access point is established, terminal 22 shifts to a normal WLAN operation state 114, in which the full complement of WLAN software is loaded into memory 92, and the terminal operates at WLAN Level 3. WiMAX operation (and memory consumption) is reduced to Level 1. At this level, memory 92 contains the minimal amount of WiMAX code that is needed to keep a connection alive to base station 26. This keep-alive function is useful, as explained above, in order to facilitate a smooth handover to WiMAX operation when terminal 22 moves out of WLAN service area 32 into transition region 34 (FIG. 2).

When terminal 22 roams out of WLAN coverage area 32, the terminal enters a WiMAX resumption state 116. In this state, the terminal communicates with base station 26 in order to resume normal WiMAX operation. The terminal loads the Level 3 WiMAX code back into memory 92 while unloading the WLAN code back down to Level 1. Normal WiMAX operation and WLAN scanning then continue in state 110, as described above.

Coordinated Timing of WLAN and WiMAX Communication

Figure 6:
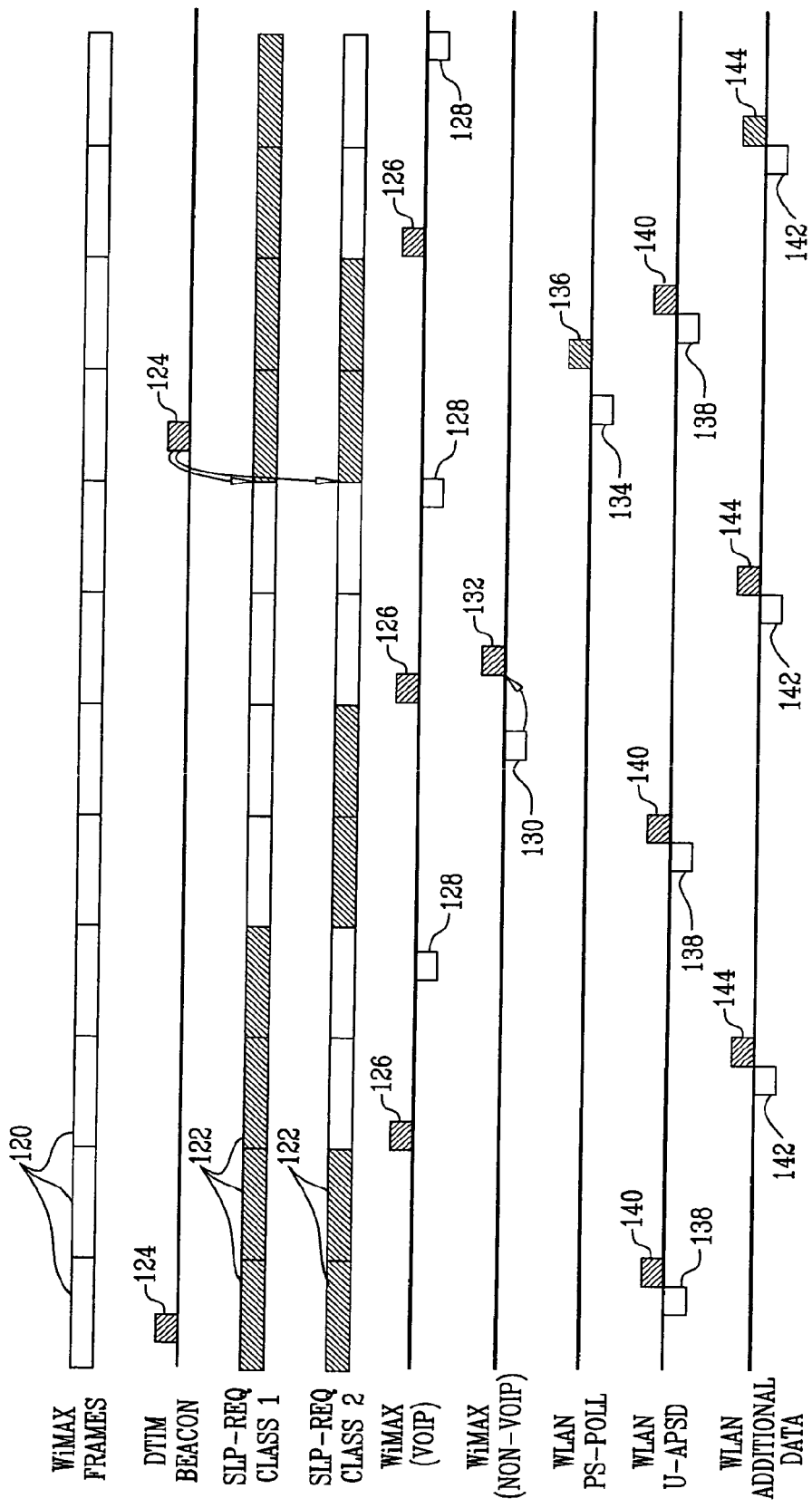
FIG. 6 is a signal timing diagram that schematically illustrates methods for controlling timing of WiMAX and WLAN transmissions, in accordance with an embodiment of the present invention.

FIG. 6 is a signal timing diagram that schematically illustrates signals used in controlling timing of WiMAX and WLAN transmissions, in accordance with an embodiment of the present invention. The methods of timing control that are described hereinbelow are useful particularly in wireless terminals that use the same radio and baseband processing resources to transmit and receive both WiMAX and WLAN signals. Thus, these methods will be described, by way of illustration, with reference to terminal 22. Alternatively or additionally, these methods may be applied in dual-function terminals with separate (but coordinated) WiMAX and WLAN radio and baseband circuits, as well as dual-function terminals with different resource-sharing schemes from those described above.

As shown in FIG. 6, as long as terminal 22 is within range of a WiMAX base station, it receives timing signals that dictate the synchronization of WiMAX frames 120. The default frame period is 5 ms. On the other hand, as explained above, WLAN access points generally operate asynchronously, and permit stations in the WLAN to send uplink signals at will, subject to signaling and backoff time constraints. Terminal 22 therefore controls the timing of its uplink transmissions in synchronization with the WiMAX frame clock, in such a manner that the terminal may interleave WiMAX and WLAN transmission and reception while minimizing interference and potential data loss. This interleaving permits the terminal to scan for and connect to WLAN access points while in the midst of data communications with a WiMAX base station, as well to keep its WiMAX connection alive during WLAN data communication in order to facilitate smooth handover to WiMAX when the terminal roams out of the WLAN service area.

To reserve certain frames 120 for WLAN communications and prevent WiMAX base station 26 from transmitting downlink signals to terminal 22 during these frames, terminal 22 sends a reduced availability message to the base station. In the embodiment describes hereinbelow, the terminal uses the sleep mechanism defined by the IEEE 802.16e standard (particularly section 6.3.21 in IEEE 802.16-2005). Alternatively, terminal 22 may use other mechanisms to signal reduced availability, such as a scanning mechanism (in which the terminal requests certain scanning intervals), or other messages that may be defined for this purpose in future standards.

The sleep mechanism is defined by the WiMAX standard as a power-saving technique, to reduce the duty cycle during which the terminal (referred to as a mobile station, or MS, in WiMAX standards) must listen for downlink signals. To invoke the mechanism, the terminal transmits a sleep request (SLP-REQ) signal to the base station, identifying the frames during which the terminal will be sleeping and will therefore not receive downlink signals. In the example shown in FIG. 6, SLP class 1 is used to define sleep windows of four successive sleep frames 122, while SLP class 2 is used to define periodic windows of two sleep frames 122. The sleep windows may then be used for WLAN transmission and reception. The periodic, shorter sleep windows may be preferable for real-time traffic, such as VoIP, whereas the longer SLP class 1 windows may be advantageous for Internet data communications. In accordance with WiMAX standards, terminal 22 is able to control the length of the sleep intervals with a granularity of one WiMAX frame 120.

WiMAX class 1 sleep may be interleaved conveniently with the WLAN power save polling mode (PS-Poll) as defined by the IEEE 802.11 standard, section 11.2. In this mode, terminal 22 makes use of beacons 124, accompanied by a delivery traffic indication message (DTIM), that are periodically broadcast by access point 24. The terminal senses these beacons, and sets the timing of WiMAX sleep frames 122 so that the sleep interval begins shortly before the next beacon 124 is expected from the WLAN access point, as shown in FIG. 6. According to the IEEE 802.11 standard, the beacon interval is 102.4 ms, so that the timing of beacons 124 will drift relative to WiMAX frames 120. To compensate for the drift, terminal 22 may send a new SLP-REQ message to base station 26 from time to time (typically once every few seconds), requesting a new sleep start frame number. Alternatively, the SLP-REQ message mandated by the 802.16 standard may be modified (together with suitable modification of the base station) to support non-integer sleep periods.

Upon receiving beacon 124 during one of sleep frames 122, terminal 22 responds by transmitting a PS-Poll uplink signal 134 to the access point. In response, the WLAN access point transmits a downlink data signal 136 to the terminal. Long WiMAX sleep intervals are desirable in this operational mode, in order to leave sufficient time for the delay of WLAN responses that is mandated by the distributed coordination function (DCF) of the IEEE 802.11 standard. Depending on the length of the sleep interval, there may be time to exchange several uplink and/or downlink packets over the WLAN between the terminal and the access point before the terminal resumes WiMAX operation.

To reinitiate WiMAX data transmission following the class 1 sleep interval, terminal 22 transmits an uplink bandwidth request (BW-REQ) signal 130. Base station 26 responds by transmitting a downlink signal 132 to the terminal, following which a data exchange may take place. Terminal 22 transmits the bandwidth request with sufficient time before the next sleep interval to ensure that the data exchange with the base station will be completed before the sleep interval begins.

For VoIP communication (and other real-time applications), terminal 22 may use a reservation message to reserve periodic bandwidth resources for WiMAX real-time communications, coupled with sleep class 2 to reserve respective frames 120 for WLAN communications. Bandwidth reservation messages that may be used for this purposes are provided, for example, by the WiMAX unsolicited grant service (UGS), real time polling service (rtPS) or extended real time polling service (ertPS), as defined in 802.16-2005, section 6.3.5.2 In the example shown in FIG. 6, the terminal reserves two frames out of every four-frame period for WiMAX, and the other two frames (during WiMAX class 2 sleep) for WLAN. In this mode of WiMAX operation, base station 26 transmits a downlink signal 126 to terminal 22 immediately following the end of the final sleep frame 122 in each sleep interval. The terminal responds to the base station with an uplink signal 128 in the next frame 120, before going back to sleep.

For WLAN real-time transmission during the WiMAX class 2 sleep intervals, terminal 22 may use a terminal-initiated transmission mechanism, such as the unscheduled automatic power save delivery (U-APSD) mechanism of the WLAN multimedia (WMM) power save mode, defined by IEEE standard 802.11e, section 11.2.1. Using this mechanism, the terminal does not wait for access point beacons, but rather transmits an uplink signal 138, containing a trigger frame and data, shortly after the beginning of the WiMAX sleep interval. Access point 24 then responds with a downlink signal 140. Alternatively, during the WiMAX sleep interval (class 1 or class 2), terminal 22 may transmit a WLAN probe request signal, to which access point 24 responds with a probe response, followed by a data exchange.

Thus, using the mechanism shown in FIG. 6 with class 2 sleep and U-APSD, terminal 22 is able to transmit at least one uplink data packet and receive at least one downlink data packet every 20 ms via each of WLAN access point 24 and WiMAX base station 26. As a result, the terminal is able to keep a VoIP call alive during handover between the two networks and may, if necessary, carry on two simultaneous calls, one on each network. (Under these circumstances, however, it may be necessary to keep both the WiMAX and WLAN processing chains fully active in terminal 22, so that the memory swapping technique described above with reference to FIG. 5 may not be practical.) Alternatively, terminal 22 may use the above schemes to scan for connections or to maintain a connection to one of the networks while carrying on a data communication session (real-time or Internet data) over the other network.

Additionally or alternatively, terminal 22 may use "microsleep" intervals within a given WiMAX frame 120 (i.e., WiMAX time slots in which there are no sub-carriers mapped to the terminal) for ad-hoc WLAN communications. Thus, in the example shown in FIG. 6, the terminal uses the U-APSD mechanism described above to transmit additional WLAN uplink data 142 and receive additional WLAN downlink data 144 during the interval between WiMAX downlink signals 126 and uplink signals 128.

Further alternatively or additionally, other patterns of wake and sleep intervals, of greater or lesser durations, may be used. For example, terminal 22 may allocate certain WiMAX sleep frames 122 to search for other WLAN access points while the terminal maintains connections both to the WiMAX base station and to the WLAN access point that is currently serving the terminal. Other standard mechanisms, such as the IEEE 802.11e hybrid coordination function (HCF), may also be used controlling the WLAN operation of the terminal. Likewise, other IEEE 802.16 standard mechanisms, such as using scan intervals, may be applied in addition or alternatively to using sleep intervals.

Power Saving Techniques

In the embodiment described above, standard power-saving modes are used in order to facilitate interleaved dual-network communication by terminal 22. Incidentally, the use of these methods can also help to reduce power consumption and extend battery life of the terminal. Terminal 22 may switch off RF receivers 48, 50 and transmitter 62 during sleep and other periods of inactivity, and may thus save substantial amounts of power. The need to maintain connections to both WLAN and WiMAX simultaneously, however, may often cause terminal 22 to consume more power than comparable single-network terminals. A number of methods for further reducing power consumption by terminal 22 are described hereinbelow.

Figure 7:
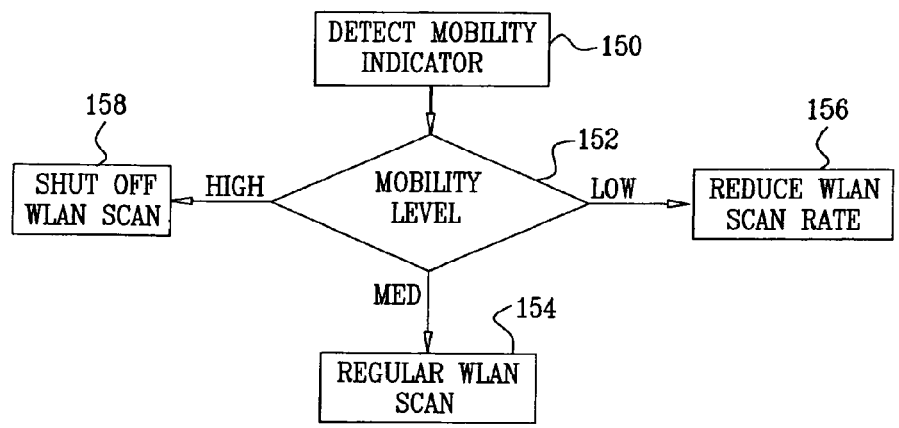
FIG. 7 is a flow chart that schematically illustrates a method for controlling scanning for WLAN availability by a dual-function mobile terminal, in accordance with an embodiment of the present invention.

FIG. 7 is a flow chart that schematically illustrates a method for controlling scanning by terminal 22 for available WLAN access points, in accordance with an embodiment of the present invention. This method may be used particularly when terminal 22 is operating outside service areas 32 of WLAN access points (FIG. 2), in order to locate access points to which the terminal may connect. In accordance with this method, terminal periodically scans for available access points, either by active scanning (probe request/probe response) or polling, as described above. Once in every scan period, the terminal scans for an access point on one of the predefined WLAN frequency channels. If no access point is found in a given scan, the terminal moves on to scan the next frequency channel in the next scan period. Increasing the scanning rate (i.e., shortening the period between scans) increases the probability of finding an access point but also increases battery consumption.

Using the method of FIG. 7, the scanning rate is adjusted according to the expected usefulness of the scan, so as to arrive at an optimal trade-off between performance and battery life of terminal 22. For this purpose, the terminal detects one or more indications of its own mobility, at a mobility detection step 150. The simplest and most straightforward method for measuring mobility is to determine directly the velocity of movement of the terminal by taking the differences between successive measurements of a positioning device, such as a GPS receiver (not shown), that is built into the terminal. Alternatively, the terminal may detect changes in WiMAX channel characteristic that are indicative of movement, such as changes in channel estimation by CE processor 78 (FIG. 4); gain variance; Doppler effect on radio frequency; or substantially any other PHY-related parameter that is influenced by movement of the terminal. MAC-level indications of cell handovers may also be used as a mobility-related trigger. Other possible mobility indicators may be generated when terminal 22 senses that it is in a desktop charging cradle (low mobility) or a motor vehicle cradle (high mobility).

Terminal 22 assesses the mobility indicator(s) to determine its current mobility level, at a mobility assessment step 152. If mobility is in a middle range, indicative of pedestrian movement (for example, in the range of 1-6 km/h), terminal 22 typically maintains a regular rate of scanning for WLAN access points, at a regular scan step 154. For example, scanning for a new channel at about one scan per second will permit the terminal to connect with an access point within 5-10 sec of entering its service area. On the other hand, if mobility is below some minimum threshold, indicating that terminal 22 is stationary (or nearly so), the chances of finding a new access point in a given scan are low. Therefore, in this situation, the terminal reduces its rate of scanning for access points, at a rate reduction step 156. Power consumption due to scanning is thus reduced.

During rapid motion (in a vehicle, for example, at 10 km/h or more), it is unlikely that terminal 22 will remain in the service area of an access point long enough to establish communications. Therefore, there is little to be gained by scanning for WLAN access points, and the terminal may stop the scanning function when the mobility is above a maximum threshold, at a shut-off step 158. Thus, no energy at all is expended on unnecessary scanning.

Although the method of FIG. 7 is described specifically with reference to dual function WiMAX/WLAN operation, the principles of this method may also be applied to other types of multi-function mobile terminals, such as cellular telephones with a WLAN interface for use in a converged cellular/VoIP network.

Figure 8A:
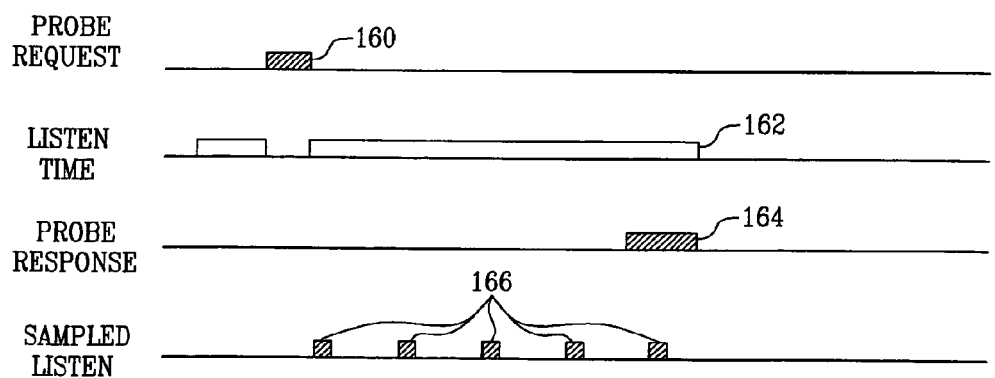
FIG. 8A is a signal timing diagram that schematically illustrates a method for detecting WLAN availability, in accordance with an embodiment of the present invention.
Figure 8B:
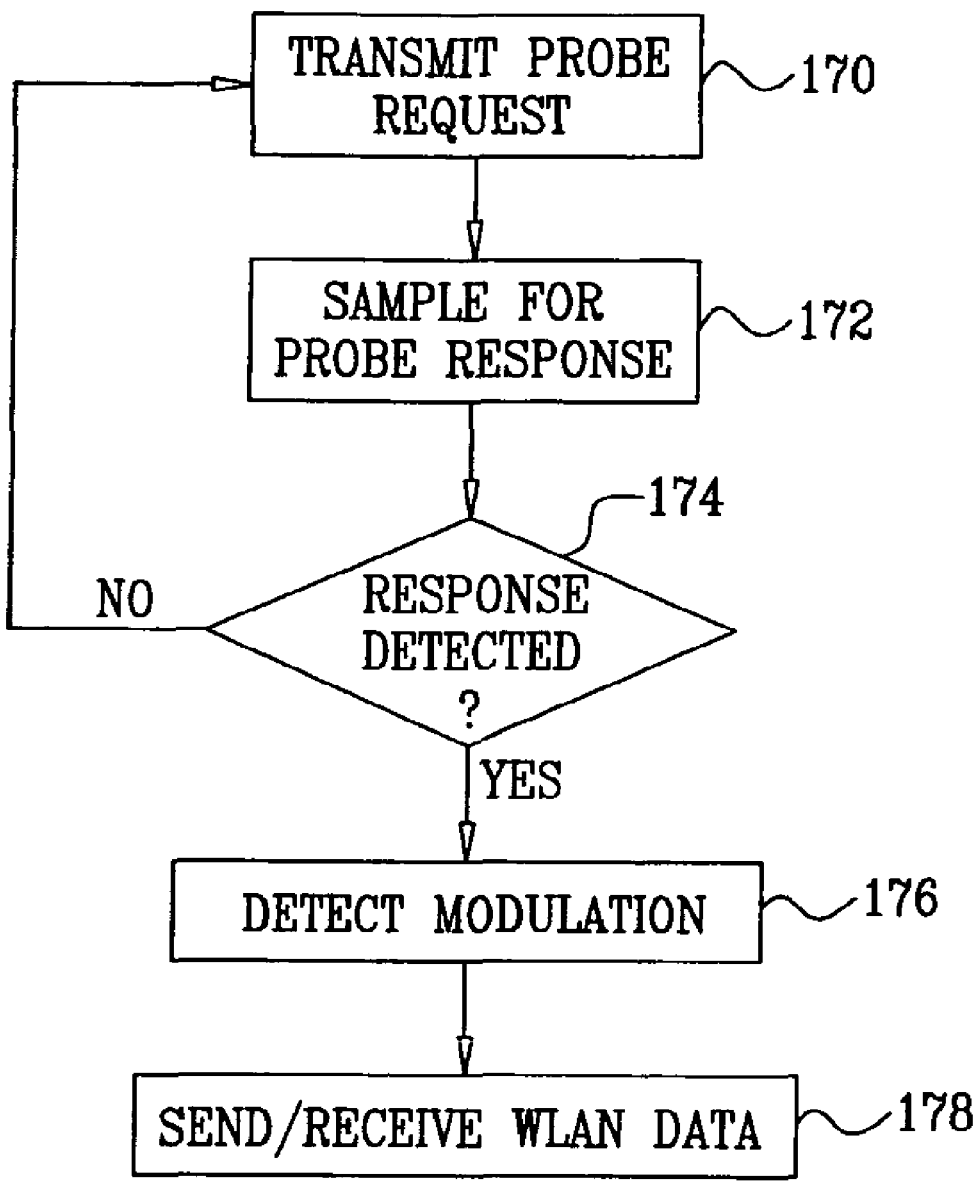
FIG. 8B is a flow chart that schematically illustrates a method for detecting and connecting to a WLAN, in accordance with an embodiment of the present invention.

FIGS. 8A and 8B schematically illustrate a method for detecting and connecting to a WLAN access point, in accordance with an embodiment of the present invention. FIG. 8A is a signal timing diagram illustrating the principles of the method, while FIG. 8B is a flow chart showing the steps in the method. This method is particularly useful in a dual-function terminal, such as terminal 22, in which rapidity of connection to the WLAN is not crucial, while reducing power consumption is highly desirable. Alternatively, the method may be used for reducing power consumption in scanning for an access point using mobile stations of other types.

As shown in FIG. 8A, in order to scan for an access point, the terminal transmits a probe request 160. If an access point receives the probe request, it may transmit a probe response 164 at any point during a listen time 162. The listen time depends on the access point but may be as long as 2-3 ms. During this period, the power consumption of the terminal is increased relative to its idle level, since the terminal must supply power to the circuits of its RF receivers while listening. These circuits tend to consume much more power than the digital processing components of the terminal.

In order to reduce this power consumption, after transmitting the probe request at a probe transmission step 170, terminal 22 samples the WLAN channel for the probe response, at a sampling step 172, as shown in FIG. 8B. A sequence of sampling gates 166 is shown, for example, in FIG. 8A. The terminal turns on the RF receiver circuits intermittently for short periods, such as a period of 10 μs in every 100 μs interval during the listen time, rather than listening continuously. The power consumed by the RF circuits during the listen time is thus reduced, relative to continuous listening, by a factor that scales roughly with the reduction in duty cycle. A duty cycle of 10% or less is particularly effective for power saving, but any duty cycle less than about 50% can be useful in this regard.

The digital receiver circuits of terminal 22 process the samples produced by the RF receiver in order to determine whether they contain an access point probe response, at a sample assessment step 174. The sampled signal itself may not provide sufficient data to permit the terminal to decode the probe response and thus determine conclusively that it has found an access point. Instead, the terminal may compute a metric based on the samples indicating the likelihood that a probe response was received. The metric may be based on a number of factors, such as signal energy, repetition (indicative of a frame preamble), or modulation characteristics (such as a Barker code or characteristics of complementary code keying (CCK) or OFDM in the signal). If the metric is low, terminal concludes that it has not found an access point and goes on to transmit a new probe request at step 170.

If the metric is above some detection threshold, however, terminal 22 next attempts to detect the modulation of the probe response, at a modulation detection step 176. At this step, the terminal may turn up the RF receiver to full-power, continuous operation in order to lock onto and decode the probe response from the access point. Step 176 may take place immediately after step 174, so as to operate on the same access point signal that was sampled at step 172. To facilitate detection of this sort and save power, terminal 22 may transmit the probe request at step 170 at 11 Mbps using CCK modulation (shortest permissible packet), and instruct the access point to answer with a direct-sequence spread spectrum (DSSS) response at 1 Mbps (longest possible packet). Alternatively, after detecting a probable probe response at step 174, the terminal may transmit another probe request and then perform step 176 on the next probe response issued by the access point.

The above steps may take place while terminal 22 is in data communication with WiMAX base station 26, during the WiMAX sleep intervals (FIG. 6). After the terminal successfully detects and demodulates the probe response from WLAN access point 24 at step 176, it begins WLAN data communication with the access point, at a WLAN data transmission step 178. Steps 176 and 178 may be accompanied by loading WLAN firmware into baseband circuits 56 and 60, while unloading the WiMAX firmware, as described above with reference to FIG. 5. Alternatively, terminal 22 may carry on communications with WLAN access point 24 while continuing to communicate with the WiMAX base station.

Although terminal 22 and the methods of operation of the terminal described above are directed specifically at dual-function WiMAX/WLAN (IEEE 802.16/IEEE 802.11) operation, the principles of the present invention may also be applied, mutatis mutandis, to other types of multi-function mobile terminals. For example, the device designs and methods described above may be adapted for use with long- and short-range wireless networks based on other standards, as well as for use in devices that interoperate with three or more different types of networks, such as WiMAX, WLAN and Bluetooth. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
    establishing a first connection between a wireless terminal and a first station in a first wireless network,;
    choosing an interval for communication between the wireless terminal and a second wireless network;
    sending a reduced availability message from the wireless terminal to the first station identifying the chosen interval as a period during which the wireless terminal will not receive data from the first station so as to prevent the first station from transmitting signals to the wireless terminal during the interval; and
    during the interval, scanning for a second connection between the wireless terminal and a second station in a second wireless network,
    wherein establishing the first connection comprises transmitting first data between the wireless terminal and the first station during time periods outside the interval, and wherein scanning for the second connection comprises transmitting second data between the wireless terminal and the second station during the interval.

2. The method according to claim 1, wherein the first wireless network defines a sequence of time frames for transmission of data between the wireless terminal and the first station, and wherein the reduced availability message specifies one or more of the time frames that define the interval.

3. The method according to claim 1, wherein the first wireless network is a long-range wireless data network, and the first station is a base station, and wherein the second wireless network is a short-range wireless data network, and the second station is an access point.

4. The method according to claim 3, wherein the long-range wireless data network is a WiMAX network, and the short-range wireless data network is a wireless local area network (WLAN).

5. The method according to claim 1, wherein a rate of the scanning is determined by a measure of mobility of the wireless terminal.

6. The method according to claim 1, wherein the reduced availability message comprises a sleep request.

7. The method according to claim 6, and comprising transmitting a bandwidth request from the wireless terminal to the first station in order to resume transmission of the data between the first station and the wireless terminal over the first connection after conclusion of the interval.

8. The method according to claim 1, wherein scanning for the second connection comprises detecting a beacon transmitted by the second station during the interval.

9. The method according to claim 8, and comprising establishing the second connection by transmitting an uplink signal during the interval in response to the beacon.

10. Apparatus for wireless communication, comprising:
a radio frequency (RF) transceiver; and
a baseband processing circuit, which is coupled to cause the RF transceiver to transmit and receive signals over the air so as to establish a first connection between the terminal and a first station in a first wireless network, to choose an interval for communication between the wireless terminal and a second wireless network, and to send a reduced availability message to the first station identifying the chosen interval as a period during which the wireless terminal will not receive data from the first station, and to scan, during the interval, for a second connection between the wireless terminal and a second station in a second wireless network,
wherein the baseband processing circuit is configured to transmit and receive first data to and from the first station during time periods outside the interval, and to transmit and receive second data to and from the second station during the interval.

11. The apparatus according to claim 10, wherein the first wireless network defines a sequence of time frames for transmission of data between the wireless terminal and the first station, and wherein the reduced availability message specifies one or more of the time frames that define the interval.

12. The apparatus according to claim 10, wherein the first wireless network is a long-range wireless data network, and the first station is a base station, and wherein the second wireless network is a short-range wireless data network, and the second station is an access point.

13. The apparatus according to claim 12, wherein the long-range wireless data network is a WiMAX network, and the short-range wireless data network is a wireless local area network (WLAN).

14. The apparatus according to claim 10, wherein the baseband processing circuitry is configured to scan for the second connection at a rate of scanning that is determined by a measure of mobility of the apparatus.

15. The apparatus according to claim 10, wherein the reduced availability message comprises a sleep request.

16. The apparatus according to claim 15, wherein the baseband processing circuitry is configured to transmit a bandwidth request to the first station in order to resume transmission of the data from the first station over the first connection after conclusion of the interval.

17. The apparatus according to claim 10, wherein the baseband processing circuitry is configured to detect a beacon transmitted by the second station during the interval.

18. The apparatus according to claim 17, wherein the baseband processing circuitry is configured to establish the second connection by transmitting an uplink signal during the interval in response to the beacon.

* * * * *